(12) United States Patent
Pradhan et al.

(10) Patent No.: US 8,495,510 B2
(45) Date of Patent: Jul. 23, 2013

(54) SYSTEM AND METHOD FOR MANAGING BROWSER EXTENSIONS

(75) Inventors: Aurobinda Pradhan, Karnataka (IN); Sachin Vinod Rathi, Maharashtra (IN)

(73) Assignee: SAP AG, Walldorf (DE)

( * ) Notice: Subject to any disclaimer, the term of this patent is extended or adjusted under 35 U.S.C. 154(b) by 1219 days.

(21) Appl. No.: 11/617,790

(22) Filed: Dec. 29, 2006

(65) Prior Publication Data
US 2008/0163088 A1 Jul. 3, 2008

(51) Int. Cl.
*G06F 3/048* (2006.01)
(52) U.S. Cl.
USPC .......................................... 715/764; 715/810
(58) Field of Classification Search
USPC ............... 707/1, 3, 4, 100; 715/764, 810, 825
See application file for complete search history.

(56) References Cited

U.S. PATENT DOCUMENTS

| | | | |
|---|---|---|---|
| 6,993,712 B2 * | 1/2006 | Ramachandran et al. | 715/234 |
| 7,543,244 B2 * | 6/2009 | Matthews et al. | 715/811 |
| 2003/0028540 A1 * | 2/2003 | Lindberg et al. | 707/100 |
| 2004/0133445 A1 * | 7/2004 | Rajan et al. | 705/1 |
| 2004/0187140 A1 * | 9/2004 | Aigner et al. | 719/328 |
| 2005/0039141 A1 * | 2/2005 | Burke et al. | 715/810 |
| 2006/0112067 A1 * | 5/2006 | Morris | 707/1 |
| 2006/0233105 A1 * | 10/2006 | Rapp | 370/230 |
| 2007/0113201 A1 * | 5/2007 | Bales et al. | 715/810 |

* cited by examiner

*Primary Examiner* — Rashawn Tillery (57) ABSTRACT

The invention describes a method and system for managing browser extensions. The method includes dynamically creating a user interface for a business object based on metadata, the user interface including a menu. A service from the menu is launched, the service corresponding to the business object. Information is retrieved from the service based on the metadata and displayed; the information related to the business object is updated dynamically for future retrievals.

31 Claims, 9 Drawing Sheets

SYSTEM AND METHOD FOR MANAGING BROWSER EXTENSIONS

FIELD OF THE INVENTION

This invention generally relates to computer network applications. More particularly, the invention relates to a system and method for managing browser extensions.

DESCRIPTION OF THE RELATED ART

Computer users work with a large and complex array of information. The information may include e-mail messages, instant messages, chats, discussion postings, calendars, contact and to-do lists, documents, photos, maps, and database records. Users interact with several dozen information types, hundreds of Web sites, and dozens of different software applications. Existing services are focused mainly on data, rather than on relationships between data. There is a growing need to enable applications and users to see how various types of information are related across different services. Therefore, a system is required for connecting, managing and sharing this information in a unified way.

The growth of the internet, as well as the increasing amount of information the internet contains, may lead to information overload in which the user is overwhelmed by more information than the user can effectively process and manage given limited time and resources.

A related problem is information complexity in which, due to sheer volume and dissociated nature of information choices on the internet, the user faces difficulty in locating desired information when it is needed.

Another related problem is lack of personalization which arises on the internet, when users are unable to effectively subscribe to, filter or control the information retrieved from services. Yet another drawback is information deficit that results when users are unable to find or do not receive the information of interest, even though it is available on the services.

The above-mentioned problems are serious obstacles to computer users. In particular, these problems are reducing the productivity of internet users. This may result in users spending increased amounts of time and resources searching for information they seek, in an attempt to ensure that information retrieved from the services is the information of interest, block or delete unwanted information received from the services, respond to information retrieved from the services, manage and organize the information of interest, track changes to the information of interest and distribute relevant information to services.

Attempts to solve above-mentioned problems may face numerous obstacles. Presently the internet includes many separate infrastructures and software tools that are used for different modes of communication. For example, e-mail communication takes place via e-mail servers and client software applications that communicate via specialized e-mail messaging protocols, yet web searching, for example, takes place using search engines and databases that are accessed via web browser software and web transaction protocols. Thus, even if one were to solve the problem of information overload for e-mail it would not necessarily solve this same problem for web searching.

Using traditional search systems, the user seeking information enters queries that are tested against databases of information that provides one or more services. If matches are found, the users are notified with links to the appropriate service. One problem with such systems is that they provide overly simplistic searches via keyword to search a complex array of information and there are no mechanisms that support higher-level organization of the information.

Furthermore, typical interactive applications provide for operating on a fixed set of file types where the file contains a single type of content. Increasingly, applications require the use of files that contain many different kinds of interleaved content or code in different programming languages. Moreover, the frequency with which new types of content and programming languages become available is increasing. These factors require a new kind of dynamically configurable interactive application.

SUMMARY OF THE INVENTION

The invention describes a method and system for managing browser extensions. The method includes dynamically creating a user interface for a business object based on metadata, the user interface including a menu. A service from the menu is launched, the service corresponding to the business object. Information is retrieved from the service based on the metadata and displayed; the information related to the business object is updated dynamically for future retrievals.

BRIEF DESCRIPTION OF THE DRAWINGS

Embodiments of the invention are illustrated by way of example, and not by way of limitation, in the figures of the accompanying drawing in which like reference numerals refer to similar elements.

DETAILED DESCRIPTION

Figure 1:
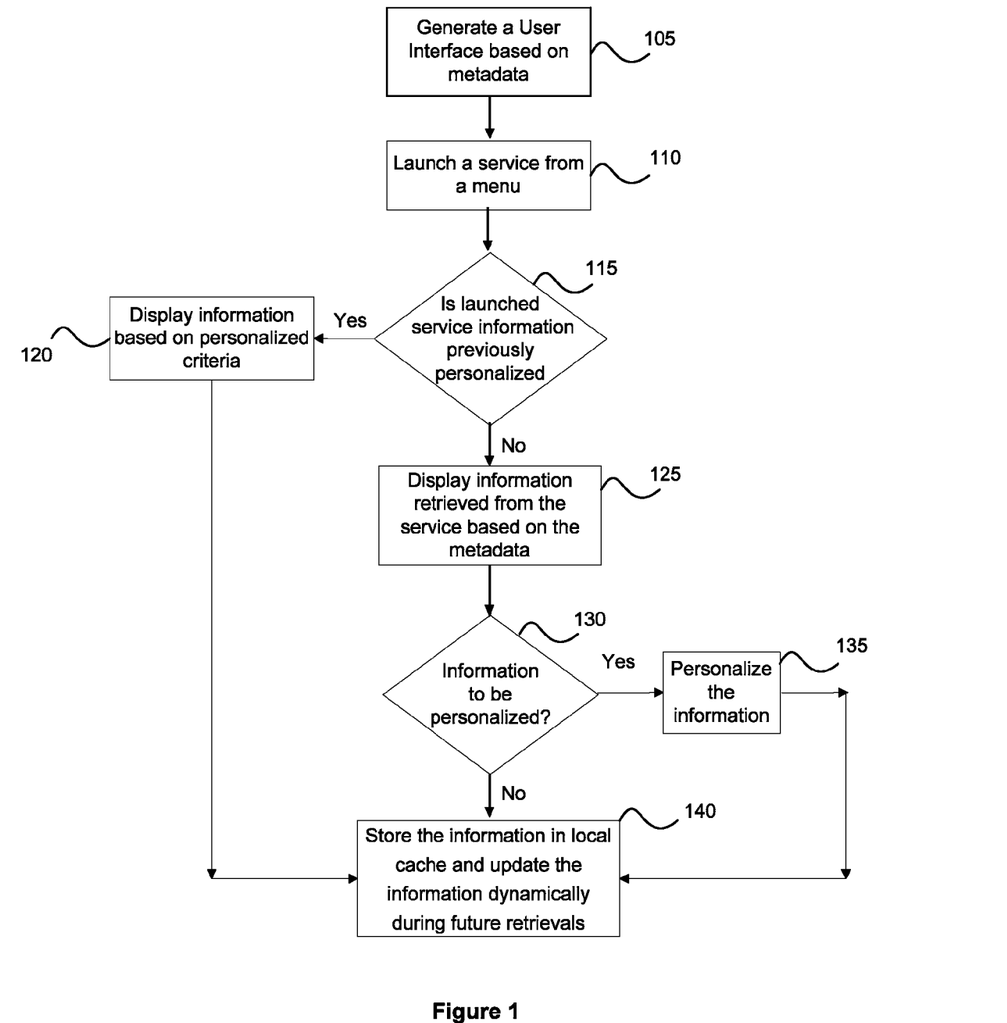
FIG. 1 illustrates a method of managing a browser extension according to an embodiment of the invention.

Embodiments of the invention are generally directed to a system and method for managing a browser extension. A method for managing browser extension is shown in FIG. 1, the method comprising dynamically creating a user interface (UI) for a business object at 105, the UI including a menu. The dynamic creation of the UI during runtime is based on metadata associated with the business object. The menu includes an extension corresponding to the business object which provides access to services related to the business object as defined in the metadata. The services are represented by a plurality of selectable items in the menu. One of the plurality of selectable items may be selected from the menu, which results in launching the selected service at 110. At 115, a determination is made as to whether the launched service information has previously been personalized by the user. If so, then at 120, the information provided by the service is displayed based on the personalization and the metadata. If not, then based on the selection of the items in the menu and the metadata, information corresponding to the business object is retrieved from the services and displayed at 125. At 130 a determination is made as to whether the user wishes to personalize the manner in which information provided by the service is displayed. If so, then at 135, the user personalizes the information. At 140, the retrieved information may be stored in a local cache and updated dynamically during future retrievals.

In another embodiment of the invention, based on the services launched, the metadata corresponding to the business objects and related domain models are provided to a user interface modeling tool to create the UI. The domain model provides information about various business objects and relationships between the business objects. If the launched service is not personalized, the information is retrieved from the services and displayed 125 based on the metadata. In such a case, the system prompts to personalize the information 130 and personalization criteria may be set 135 for the retrieved information. For instance, the user may define a context sensitive search by sending an extensible markup language (XML) request to a browser framework stating conditions for the context sensitive search. Such context sensitive search may be a function of elements of the UI. For example, if the user is on a courier tracking business application and wishes to search for a tracking identifier ("TRACK ID") 12345, in a typical search, the search may retrieve and display both result of interest and undesirable results. The user may personalize the information with respect to the TRACK ID 12345 by sending an XML request to the browser framework wherein the TRACK ID 12345 may be linked to the result of interest. The association of the TRACK ID 12345 and the result of interest along with retrieved information from the service are stored in the local cache. During future retrievals related to TRACK ID 12345, the associated result of interest information is updated dynamically during runtime and is retrieved from the local cache, thereby improving the efficiency with which results are provided. If the launched service is personalized; the information from the services is displayed based on the personalization criteria 120 as described with respect to the TRACK ID 12345 example. This disclosure is not limited to any particular UI or business application. Those of skill in the art will recognize that many other UI embodiments, context sensitive and business applications are possible and fully within the scope and spirit of this disclosure.

As the extension is metadata driven, in one embodiment of the invention, the metadata is defined for the business object, the domain model, the user interface (UI), a validation and a vocabulary. The business object and domain model metadata may include business object name, business object namespace, business object actions, business object queries, business object associations, business object attributes and business object status. Similarly, the UI metadata may include UI creation metadata that includes UI type (defining menu, toolbar and band), UI data (defining actual data to be shown in the menu, toolbar and bands), UI location (defining relative positioning of UI elements on UI), UI action (defining actions to be performed on the UI when an operation is performed such as accessing the menu). The UI metadata further includes UI modification metadata which includes UI identification (defining which UI element to modify when one of the items is selected from the menu), UI modification action (defining action to be performed on the UI when the user performs an operation on the modified UI and the associated changes which occur in the UI). The validation metadata may include a validation identification (defining which UI element to modify with respect to the credentials of the user), a validation text (defining what to show on UI if the validation either fails or succeeds), a validation function reference (defining which service to execute to validate the user). Similarly, the vocabulary metadata acts as additional information to include user defined metadata. The vocabulary includes vocabulary identification defining what element is to be included in the metadata (e.g., in the above tracking identifier example, TRACK ID 12345 is defined as the vocabulary identification) and vocabulary term defining the action which needs to be performed on the verification identification metadata (e.g., in above example, linking a particular search result and providing updated dynamic information during future retrievals is the vocabulary term for vocabulary identification TRACK ID 12345). The metadata may either be singular or a combination of the above-mentioned metadata definitions.

One embodiment of the invention also includes providing browser framework information which includes parse contextual metadata, parse rule definitions, action definitions, user interaction elements, UI manipulation rules, communication protocol definition and automatic learning features for a browser framework.

Similarly, one embodiment of the invention also includes providing server contextual framework information, which includes but not limited to device definition, device specific context generator, pluggable provider framework and providers for a server contextual framework.

The menu may be selected from a context menu, pie menu, drop-down menu and domain bar. The plurality of selectable items may also include a text entry box, and an agent to receive a selection of an item of the plurality of selectable items and a string from the text entry box.

The selectable items are associated with specific actions related to the business object, as defined in the metadata. The selection may be performed by using a variety of pointing devices and techniques such as pressing of a button on a mouse, pressing a button on a stylus, pressing a key on a keyboard or speaking a voice command. The text box entry is particularly used for searching desired information in services. The selection and search includes sending a query to servers based upon the selection and a string to output results received as the retrieved information in response to the query. The query may be sent over, but not limited to, a wired or wireless network, a bus bar or any other means which provides interaction among business applications.

The service includes both internal and external services. The internal services may include services available within an organization through internal databases and systems of the organization. The external system may include any third party services and external databases.

Figure 2:
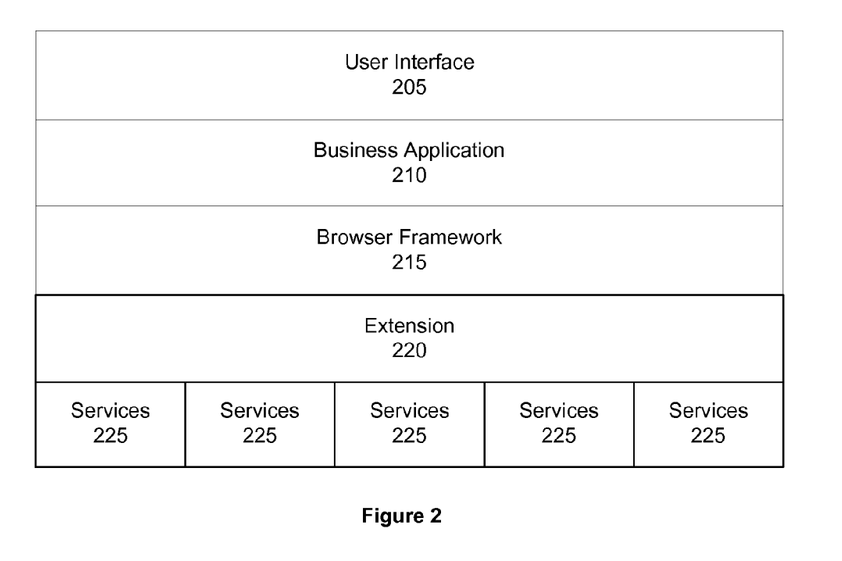
FIG. 2 illustrates a business application according to an embodiment of the invention.

FIG. 2 is an exemplary illustration of a business application based on a business object. In one embodiment, a business application 210 includes a user interface (UI) 205 and a set of services 225. The business application and its services may extend the functionality of the UI using an extension 220 through a browser framework 215. By way of a non-limiting example, the UI may include one or more of the following: 1) a graphical user interface (GUI) (e.g., rendered with hypertext markup language (HTML)); 2) logic to respond to sounds and/or voice commands; 3) logic to respond to input from a remote control device (e.g., a cellular telephone, a PDA, or other suitable remote control); 4) logic to respond to gestures (e.g., facial and otherwise); 5) logic to respond to commands from a process on the same or another computing device; and 6) logic to respond to input from a computer mouse and/or keyboard. However, as previously mentioned, the underlying principles of the invention are not limited to any particular UI. Those of skill in the art will recognize that many other UI embodiments are possible and fully within the scope and spirit of this disclosure.

Each service may be associated with the extension 220. The extension may include services that the extension implements. For instance, a debugger extension defines a debugger service. Services may be consumed by an extension's classes and the services may be registered with the system using tags in an XML file (e.g., an extensions.xml file). In one embodiment, when a business application is generated using the metadata, a business application run-time component may read the extension.xml file to ensure that the services requested by the user are available.

Figure 3:
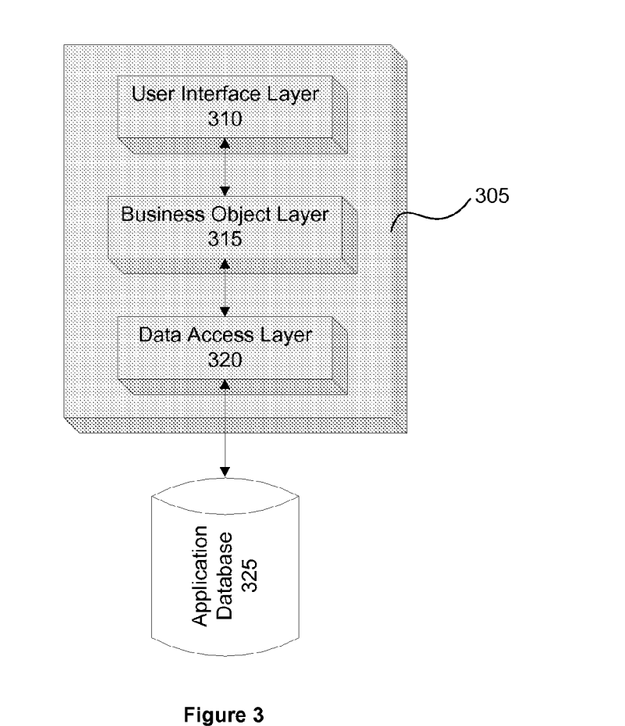
FIG. 3 illustrates structure of a business application according to one embodiment of the present invention.

FIG. 3 illustrates structure of the business application according to one embodiment of the present invention. Business application Framework 305 includes a user interface (UI) layer 310, a business object layer 315 and a data access layer 320. In general, the framework layers provide for separation and modularization of functionalities and services of a software application. These functionalities are integrated into a single application via common interfaces that allow data to be exchanged between any two layers. For example, the business object layer 315, which is used in part to define the functionality, structure and logic of an application, exists independently from UI layer 310, which provides functionality for displaying a user interface to the user. Since different devices have varying degrees of capabilities with respect to the various functionalities associated with the framework layers, the framework allows for flexible adaptation of a software application to accommodate the capabilities of various devices.

The UI layer 310 provides functionality for presenting a computing user with a graphical user interface. For example, according to one embodiment, user interface layer may include a plurality of hypertext markup language (HTML) or extensible markup language (XML) pages, which are fetched via a browser resident on the user computing device and presented to the user.

The UI layer 310 may include an interaction layer, which provides functionality for responding to interactions between the user and the UI layer 310. For example, the interaction layer may include logic for performing certain functions based upon a user clicking a particular portion of the UI.

Business object layer 315 includes functionality for the core business logic underlying the application running on the computing device. According to one embodiment of the present invention, an application is modeled through the definition of business objects as defined by the metadata. As described in detail below, business objects provide an abstraction of an underlying relational database such as application database 325 and thereby facilitate development of a business application to include common notions of business entities. Among other functions, business object layer 315 performs validations of data entered by a user. As described in detail below, a modeler 410 allows a developer to define business objects, business object properties, domain models, business rules (e.g., validation rules), which define the logic relating to particular business objects and business query modeling.

Data access layer 320 provides functionality for interactions with application database 325. The data access layer 320 provides an interface to relate particular business objects with corresponding tables and fields in the application database 325.

Figure 4:
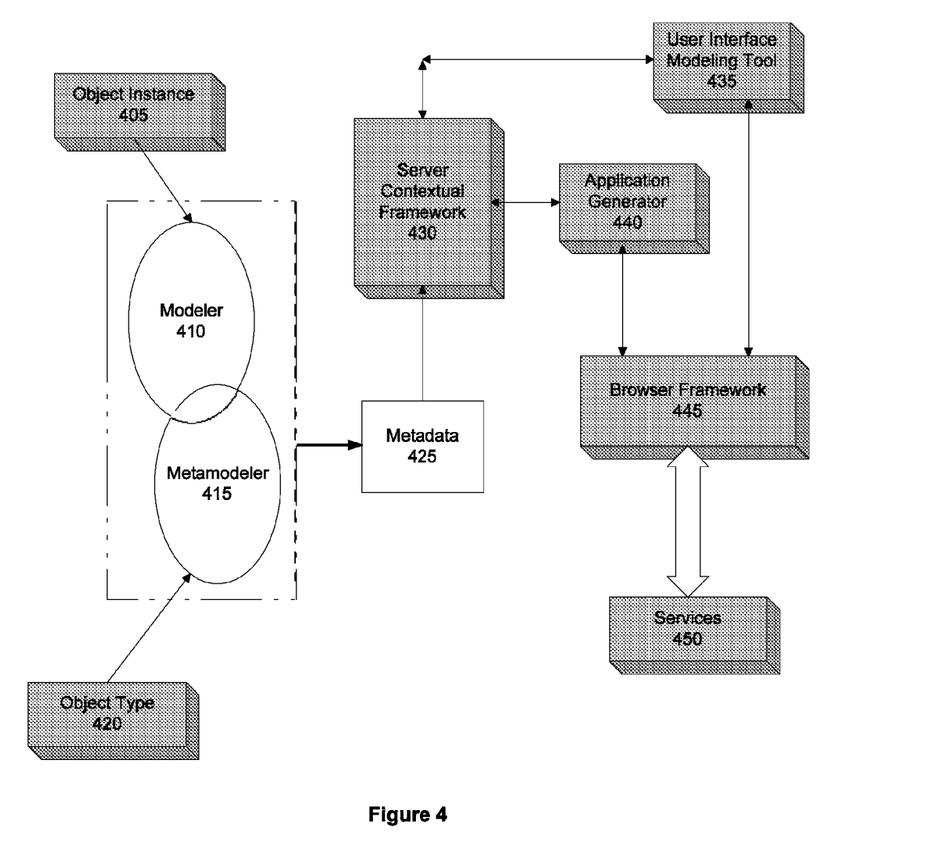
FIG. 4 illustrates architecture diagram to render business application to a browser according to an embodiment of the invention.

FIG. 4 shows an architecture diagram to render a business application to the browser according to an embodiment of the invention. Metamodeler 415 provides for the modeling of object types and metadata 425 comprises instances of the object types 420. Metamodeler 415 also provides a development tool for specifying any number of object types. Typically there is a close relationship between the business application framework 305 and the particular object types that are defined via the metamodeler 415. Thus, according to one embodiment, utilizing the business application framework (refer FIG. 3, 305) with a UI layer (refer FIG. 3, 310), business object layer (refer FIG. 3, 315) and interaction layer (included in the UI layer 310), the metamodeler 415 provides a definition of user interface type objects, interaction objects and other object types relating to the corresponding layers in the framework. Thus, the object types 420 defined via metamodeler 415 may correspond to particular runtime entities, which comprise the business application framework (refer FIG. 3, 305).

Modeler 410 typically is a modeling tool for specifying the generic behavior and structure of an application. In particular, the modeler 410 provides functionality for specifying instances of object types 420 defined in the metamodeler 415. An application is specified via the modeler 410 by modeling instances 405 of the object types 420 comprising an application. According to one embodiment, the instances 405 of the object types 420 include attributes and functional behavior of that object instance within an application. Using object instances 405, the modeler 410 generates the metadata 425, which generically specifies the behavior of the application. The structure and function of the metadata 425 is described above.

The generated metadata 425 is provided to the server contextual framework 430. The metadata along with the server contextual framework information is provided to a user interface (UI) modeling tool 435 and an application generator 440. The server contextual framework 430 is described in greater detail below. UI creation may use UI modeling tools 435 like Visual Composer to model and configure UI building blocks. The UI modeling tool assists in code-free creation of application UI. The UI modeling tool assists in creating a model, selecting a floor plan, binding business objects to the floor plan, adding views and then executing the model to create the UI during runtime. In addition, the UI modeling tool 435 is used to model a contextual search pattern. The application generator 440 parses the metadata to generate application runtime files. According to one embodiment of the invention, the application generator 440 generates application runtime files for a specific browser on a computing device having particular processing and memory capabilities.

The created UI and the business application are rendered to the browser. The browser includes a browser framework 445 which includes browser framework (BF) information. The BF information may include parse contextual metadata, parse rule definitions, action definitions, user interaction elements, User Interface manipulation rules, communication protocol definitions and automatic learning features for a browser framework. The BF is described in greater detail below. As described above, the UI includes the menu and the menu includes the extension. The extension provides access to services through a plurality of selectable items. Based upon the selection, information is retrieved from the services. Through the application generator 405 and the UI modeling tool 435, the browser framework requests rendering of business applications and corresponding UI from the server contextual framework 430.

Figure 5:
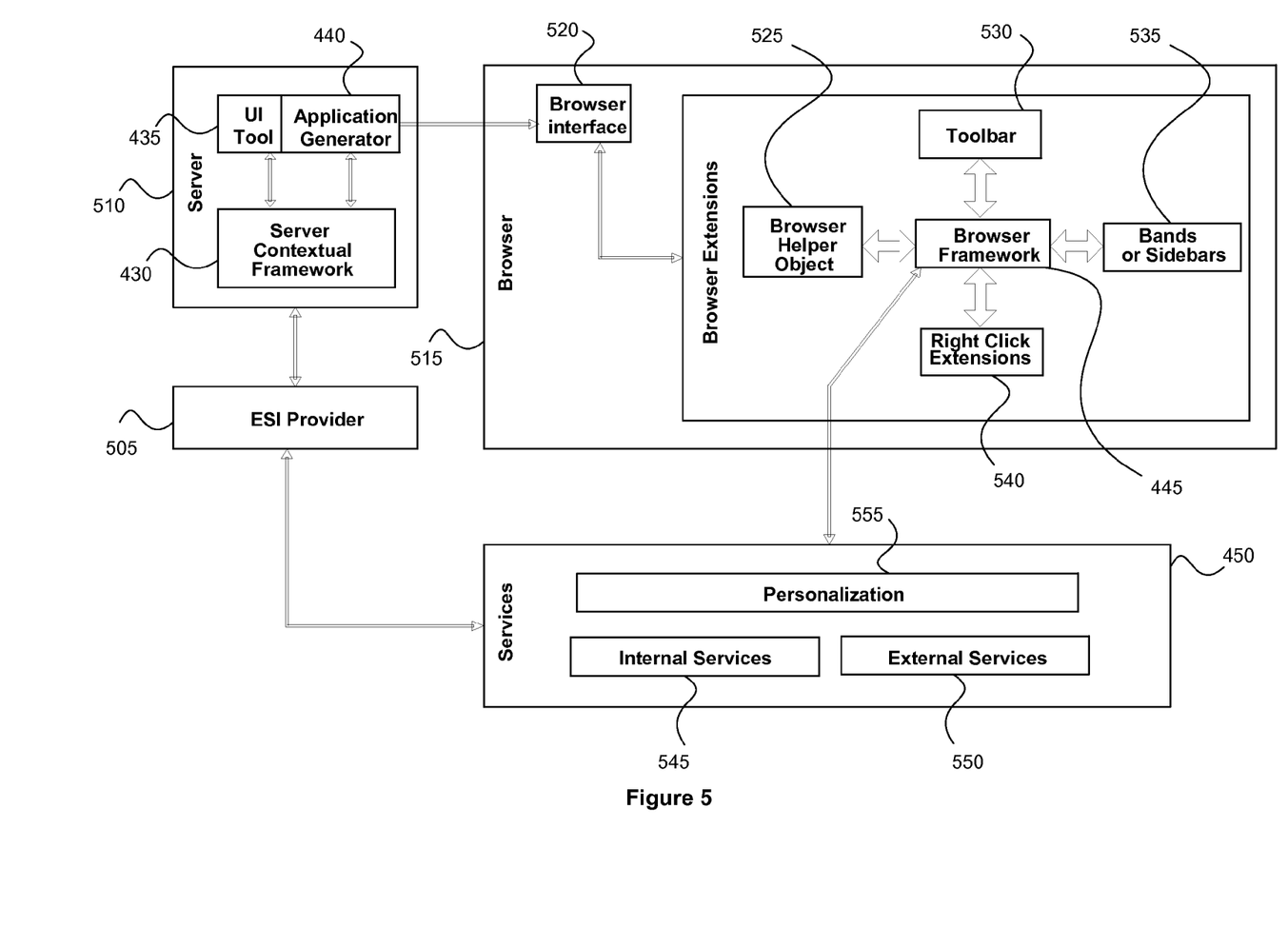
FIG. 5 illustrates architecture for managing a browser extension according to an embodiment of the invention.

In FIG. 5, another embodiment of the invention is shown which illustrates architecture for managing a browser extension. The architecture includes application server 510 which includes the server contextual framework 430 and the UI modeling tool 435 and the application generator 440. The server contextual framework 430, the UI modeling tool 435 and the application generator 440 operates in the similar manner as the server contextual framework 430, the UI modeling tool 435 and the application generator 440 of the architecture of FIG. 4, respectively. On a user display, a business application and a created UI based on the metadata are rendered as a browser interface 520 by the application generator 440 and the UI modeling tool 435. The browser framework 445 manages extensions through the information and definitions included in the browser framework 445. The extensions are accessible as a menu and available in browser helper object 525, toolbar 530, bands or sidebars 535 and/or a right-click extension 540. The menu comprises of a plurality of selectable items, each item corresponding to the service; a text box entry; and an agent to receive a selection of an item of the plurality of selectable items and a string from the text entry box.

Based upon selection of service from a plurality of services associated with the extension and the string, a query sending tool sends a query to servers based upon the selection and the string and outputs results received as information in response to the query. A retrieval engine retrieves information from the services 450 and displays the retrieved information. The services may include internal services 545 and external services 550.

The architecture further includes a personalization engine 555 to personalize the retrieved information based on user-specified personalization criteria. For example, the user may personalize a listing of vendors of 'Article A'0 in supplier relationship management (SRM) information by defining a rule for segregation of a listing of vendors. When the same information that is a listing of vendors is accessed in the future, the listing will be displayed as per the personalization criteria. In addition, as mentioned above, the retrieved information is stored in the local cache and during future retrievals is retrieved from the local cache and updated dynamically at runtime. The personalization criteria are passed to enterprise service infrastructure (ESI) provider 505 as an XML request, which in turn is passed to the server contextual framework 430. In addition, those skilled in the art will recognize that many other alternatives are possible in the described architecture while still complying with the underlying principles of the invention. For example, in addition to passing personalization criteria to the server contextual framework, other features such as service-oriented interactions among enterprise applications, data flow, workflow, process management and security features may also be provided to the server contextual framework.

Figure 6:
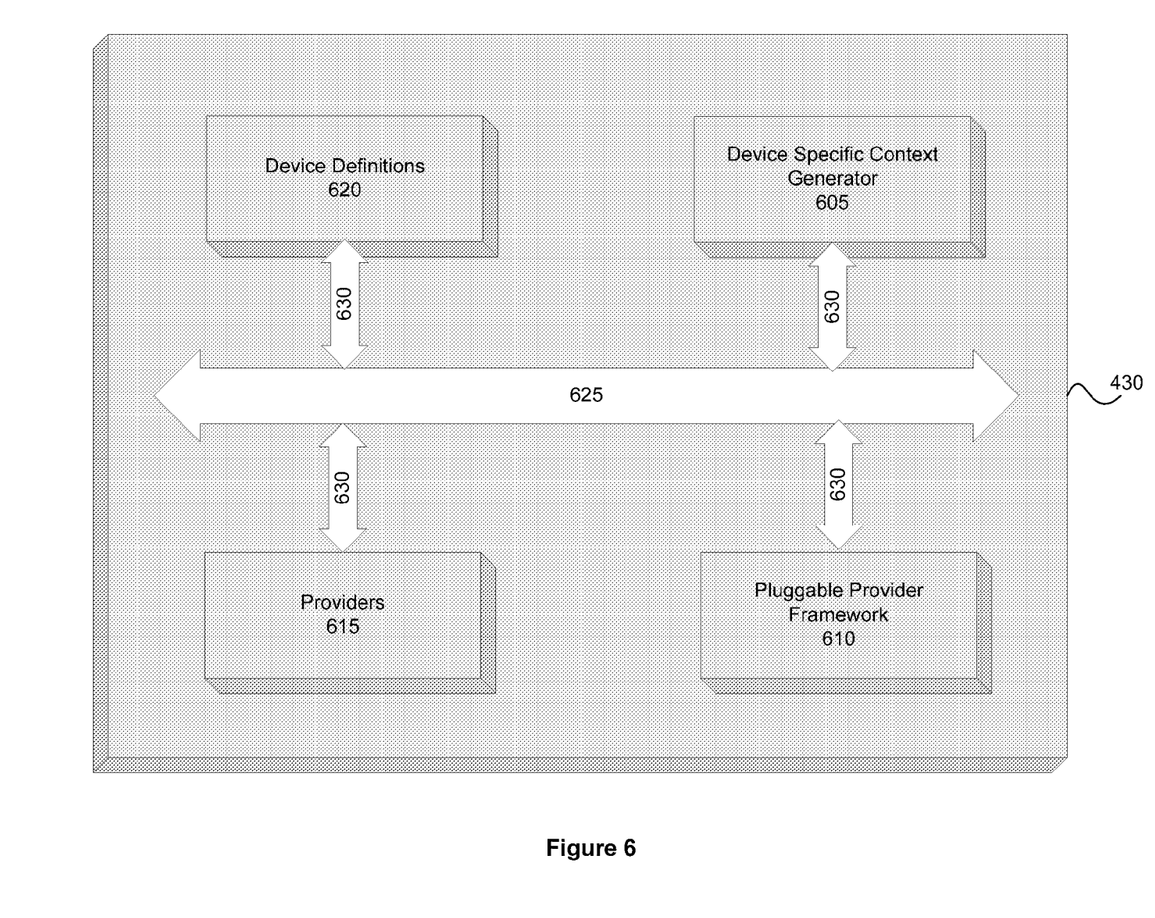
FIG. 6 illustrates architecture of a server contextual framework according to an embodiment of the invention.

FIG. 6 illustrates architecture of a server contextual framework 430 according to an embodiment of the invention. Business applications typically need a context representation in order to adapt to user needs. This potentially includes reducing the complexity of displayed data as well as offering additional related information which is relevant for a particular object instance. The server contextual framework 430 obtains context information from the business objects.

The server contextual framework 430 includes device definitions 620 defining the device on which the UI and business application will be rendered and a device specific context generator 605 which identifies a particular device (e.g., based on a device ID) and generates a relevant context for the device based on the identification of the device. The server contextual framework 430 further includes a pluggable provider framework 610 which is typically an interface providing a plug-in facility for providers with the server contextual framework 430. This enables the server contextual framework 430 to obtain relevant contextual information from various providers. The providers 615 may include providers which provide contextual information to the Server Contextual Framework. The providers may include enterprise service infrastructure providers, enterprise resource planning (ERP) providers, web services, third party web sites and any other type of provider. The server contextual framework 430 components may communicate among each other through communication channels 625 and 630 respectively.

Figure 7:
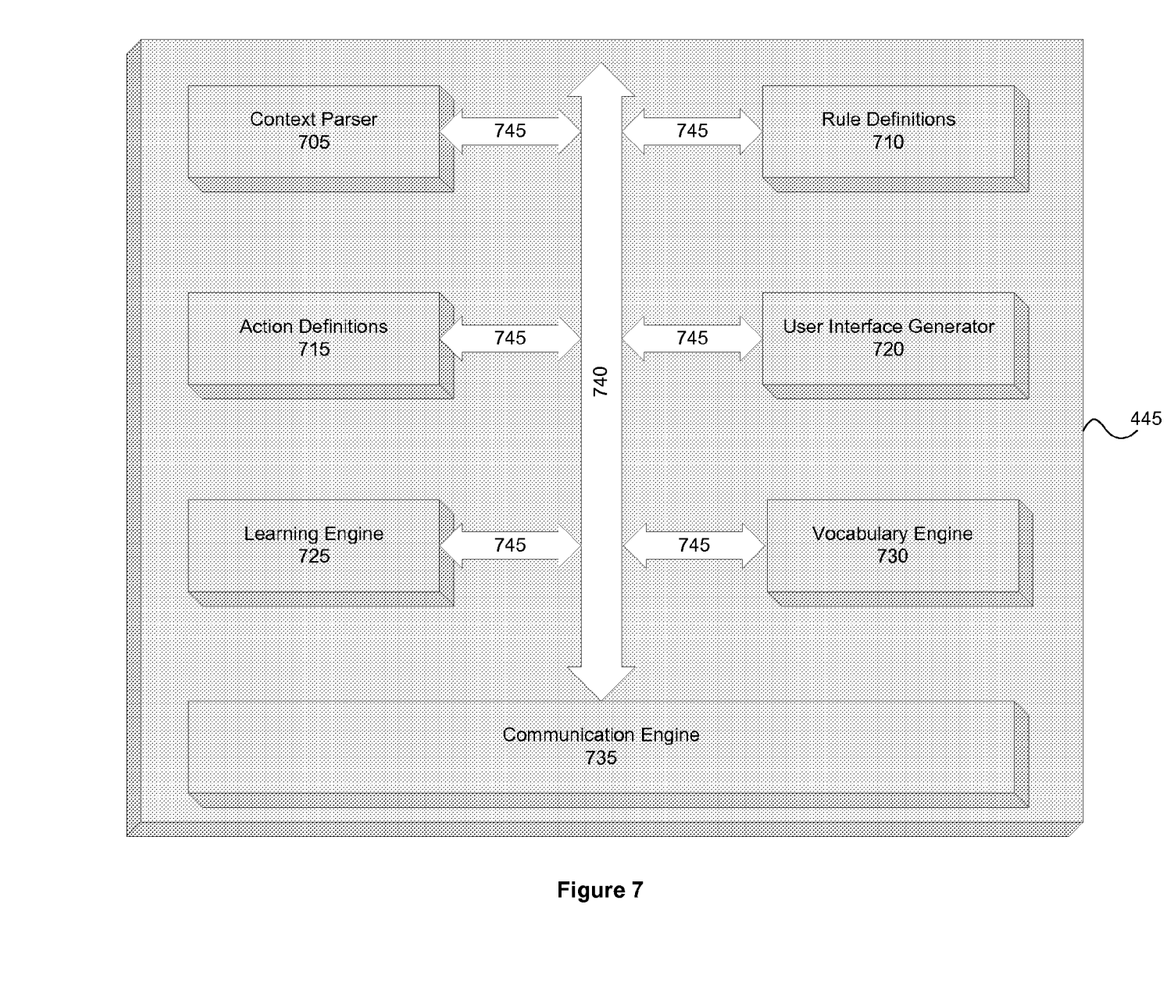
FIG. 7 illustrates architecture of a browser framework according to an embodiment of the invention.

FIG. 7 illustrates architecture of a browser framework 445 according to an embodiment of the invention. The browser framework 445 provides indicative information to the user by way of actions, UI creation, UI modifications. The browser framework 445 may include a context parser 705, rule definitions 710, action definitions 715, UI generator 720, a learning engine 725, a vocabulary engine 730 and a communication engine 735.

In FIG. 7, the context parser 705 receives and understands the contextual information provided by the application server and stores and manipulates the contextual information into a format which is recognizable by the browser framework. The rule definitions 710 define the way the browser framework 445 may provide action options to the user. The action definitions 715 define the action performed by the browser framework 445 when one of the services, as represented by the plurality of selectable items, is selected from the menu. The UI generator 720 defines the UI to be created when one of the plurality of items from the menu is selected. The learning engine 725 tracks the personalization criteria set by the user. The stored personalized criteria enable the browser framework 445 to make context sensitive decisions. This includes the database corresponding to the internal or external service in which to look for information when a particular service is launched from the menu. The vocabulary engine 730 includes a predefined context sensitive vocabulary and also stores the personalized criteria set by the user for segregation of retrieved information. The personalized criteria are also included in the vocabulary engine resulting in a richer and more context sensitive vocabulary database. It may be observed that the learning engine communicates with the vocabulary engine for the working of the browser framework. Therefore, components of the browser framework 445 may communicate among each other through communication channels 740 and 745 respectively. In addition, the browser framework 445 communicates with any internal or external services via a communication engine 735. Those skilled in the art may appreciate that the browser framework 445 may have a variety of other configurable characteristics such as additional context related logics, UI related logics, extensible and pluggable custom properties.

Figure 8:
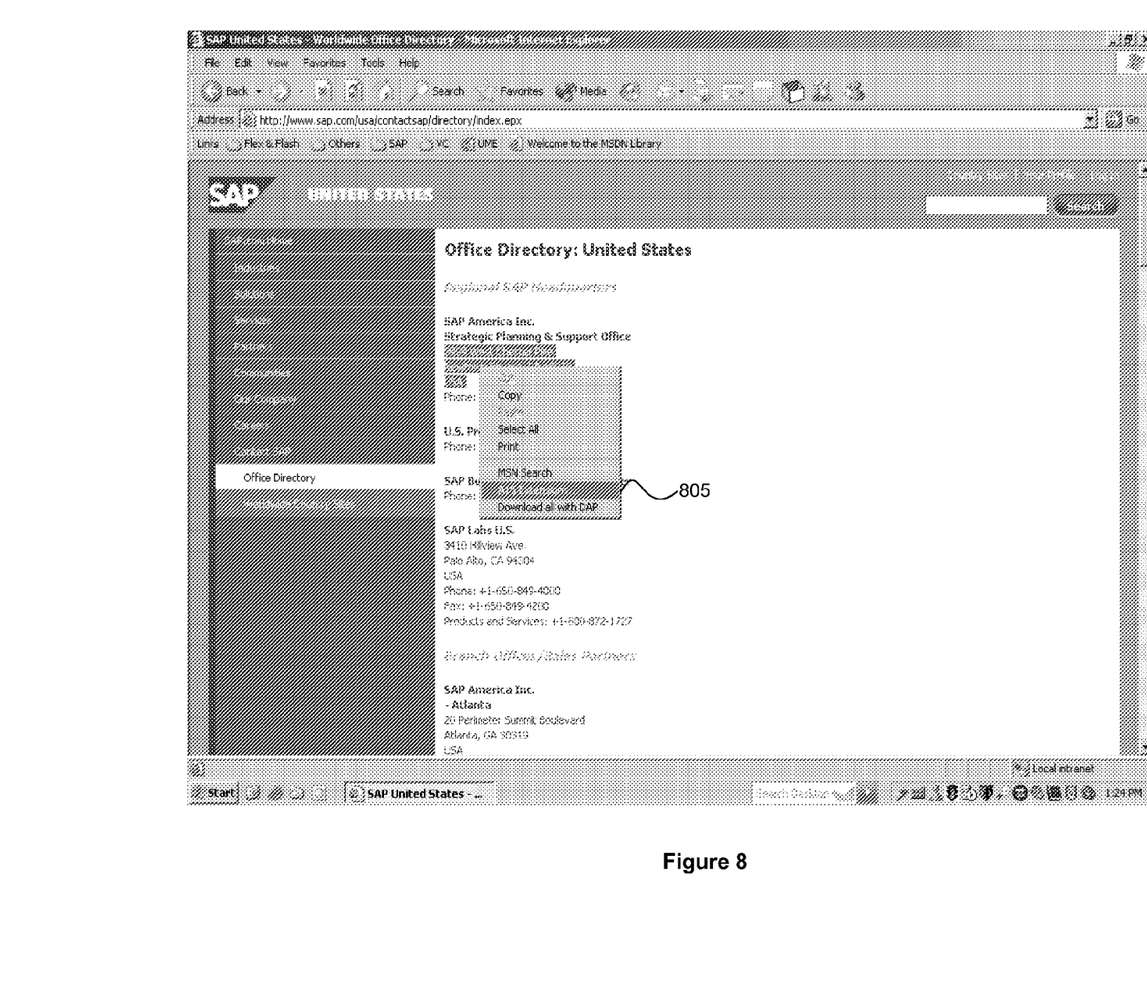
FIG. 8 illustrates an extension in an example according to an embodiment of the invention.
Figure 9:
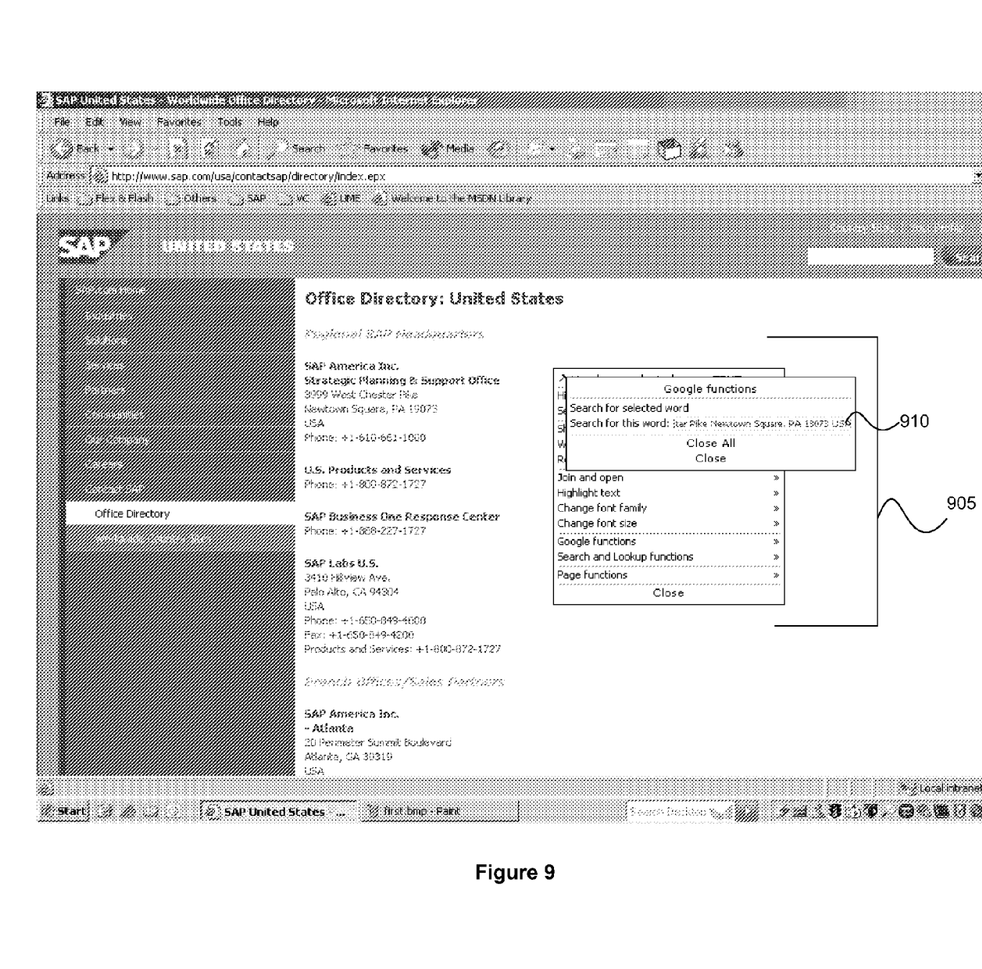
FIG. 9 illustrates a list of items accessible through extension in an example according to an embodiment of the invention.
Figure 10:
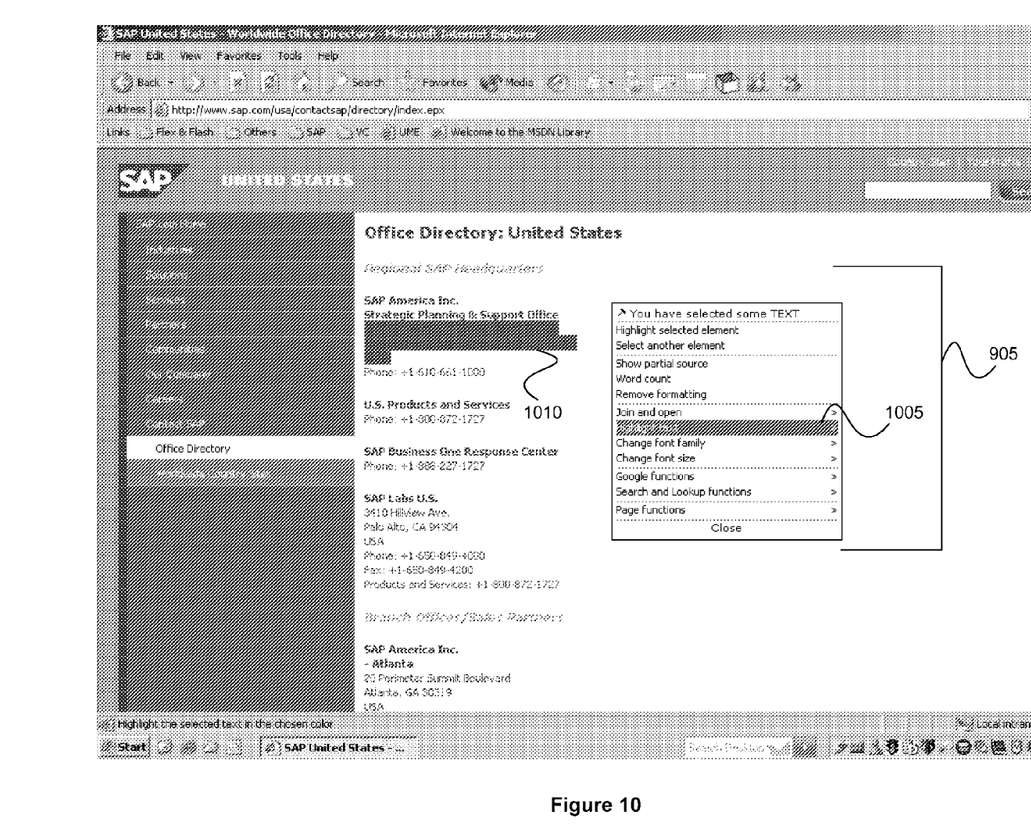
FIG. 10 illustrates personalization using the list of items in an example according to an embodiment of the invention.

By way of a non-limiting example, FIG. 8 illustrates an extension 805 in a right-click menu. In this example, the user has highlighted a portion of a web page and right clicked with a mouse or other cursor control device. FIG. 9 illustrates an exemplary menu 905 generated in response to user-selection of the extension 805. The menu 905 includes a plurality of items corresponding to services and a text entry box 910 to enter a string is shown. It is shown that a context sensitive search based on UI elements of the displayed web page is made. In FIG. 10, one of the services 'Highlight text' 1005 is selected from the menu 905 after the search. In this case, the context sensitive search based on the UI element and selection of the service 'Highlight text' resulted in highlighting the searched text 1010. It may be seen that the example is only one of many potential implementations of the present invention.

Other embodiments of the invention may be implemented in digital electronic circuitry, or in computer hardware, firmware, software, or in combinations of them.

Elements of the invention may also be provided as a machine-readable medium for storing the machine-executable instructions. The machine-readable medium is an article of manufacture that may include, but is not limited to, Flash memory, optical disks, CD-ROMs, DVD ROMs, RAMs, EPROMs, EEPROMs, magnetic or optical cards, or other type of tangible machine-readable media suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. The underlying principles of the invention may be employed using a virtually unlimited number of different types of input data and associated actions.

Accordingly, the scope and spirit of the invention should be judged in terms of the claims which follow.

What is claimed is:

1. A method for managing user interface extensions comprising:
    dynamically creating a user interface for a business object based on metadata defining the business object in a business object layer of a computer application, wherein the metadata describes attributes and functional behavior of at least one business object element;
    registering at least one service with the user interface, wherein the at least one service is provided by at least one separate computer application outside the business object layer;
    in the user interface, dynamically creating a menu based on the metadata defining the business object in the business object layer of the computer application;
    dynamically extending the menu with access to a service of the at least one service relevant to a current business object element, wherein the relevancy between the service and the current business object element is identified based on the metadata defining the business object;
    launching the service by sending a corresponding request to the at least one separate application, wherein the corresponding request is based on the metadata defining the business object; and
    based on the metadata defining the business object, outputting information retrieved from the service.

2. The method of claim 1, wherein dynamically creating the user interface comprises:
    providing the metadata associated with defining the business object to a user interface modeling tool.

3. The method of claim 1, further comprising generating the metadata defining the business object, wherein the metadata is selected from a group consisting of business object metadata, domain model metadata, user interface metadata, a validation metadata, and a vocabulary metadata.

4. The method of claim 1, further comprising defining browser framework information selected from a group consisting of parse contextual metadata, parse rule definition, action definitions, user interaction elements, User Interface manipulation rules, communication protocol definition and automatic learning features for a browser framework.

5. The method of claim 1, further comprising defining server contextual framework information selected from a group consisting of device definition, device specific context generator, pluggable provider framework and providers for a server contextual framework.

6. The method of claim 1, wherein the menu is selected from a group consisting of context menu, pie menu, drop down menu and domain bar.

7. The method of claim 1, wherein launching the service comprises:
    receiving a selection of an item from the extension of the menu, wherein the item represents the service; and
    receiving a string at a text entry box corresponding to the service, wherein the text entry box is opened in response to the selection of the item.

8. The method of claim 7, further comprising sending a query based upon the selection and the string to at least one server where the separate application is executed, and outputting results received in response to the query.

9. The method of claim 1, wherein the service is selected from a group consisting of an internal service provided through internal databases and systems of an organization, and an external service provided through third party databases and systems.

10. The method of claim 1, further comprising:
    personalizing criteria for output segregation of information retrieved by the service.

11. An article of manufacture comprising a tangible non-transitory machine readable medium to store instructions, which when executed by a machine, cause the machine to:
    dynamically create a user interface for a business object based on metadata defining the business object in a business object layer of a computer application;
    register at least one service provided by at least one separate computer application;
    in the user interface, dynamically create a menu based on the metadata defining the business object in the business object layer of the computer application
    dynamically extend the menu with access to a service of the at least one service based on a relation between the service and a current element of the business object as defined in the metadata; and
    launch the service by sending a corresponding request to the at least one separate application, wherein the request is based on the metadata.

12. The article of manufacture of claim 11, wherein the article of manufacture stores instructions, which when executed by a machine, causes the machine to generate the metadata defining the business object, wherein the metadata is selected from a group consisting of business object metadata, domain model metadata, user interface metadata, a validation metadata, and a vocabulary metadata.

13. The article of manufacture of claim 11, wherein the article of manufacture stores instructions, which when executed by a machine, causes the machine to define browser framework information selected from a group consisting of parse contextual metadata, parse rule definition, action definitions, user interaction elements, User Interface manipulation rules, communication protocol definition and automatic learning features for a browser framework.

14. The article of manufacture of claim 11, wherein the article of manufacture stores instructions, which when executed by a machine, causes the machine to define server contextual framework information selected from a group consisting of device definition, device specific context generator, pluggable provider framework and providers for a server contextual browser.

15. The article of manufacture of claim 11, wherein the article of manufacture stores instructions, which when executed by a machine, causes the machine to create the menu selected from a group consisting of context menu, pie menu, drop down menu and domain bar.

16. The article of manufacture of claim 11, wherein the article of manufacture stores instructions, which when executed by a machine, causes the machine to create the extension of the menu as one or more selectable items, wherein each item of the one or more selectable items corresponds to the business object and represents a service of the plurality of registered services.

17. The article of manufacture of claim 16, wherein the article of manufacture stores instructions, which when executed by a machine, causes the machine to receive a string and a selection of an item of the one or more selectable items.

18. The article of manufacture of claim 17, wherein the article of manufacture stores instructions, which when executed by a machine, causes the machine to send a query to at least one server based upon the selection and the string, and to output results received in response.

19. The article of manufacture of claim 18, wherein the article of manufacture stores instructions, which when executed by a machine, causes the machine to launch the service selected from a group consisting of an internal service provided through one or more internal databases and systems of an organization, and an external service provided through one or more third party databases and systems.

20. The article of manufacture of claim 11, wherein the article of manufacture stores instructions, which when executed by a machine, causes the machine to:
    storing segregated information in a cache, wherein the segregated information is subtracted based on the personalization criteria from information received from the service; and
    outputting the segregated information from the cache in response to a service launch.

21. A system for providing user interface extensions comprising:
    a processor; and
    a memory coupled to the processor storing instructions, which when executed from the memory, cause the processor to:
        generate metadata associated with a business object in a business object layer of a computer application;
        dynamically create a user interface for the business object based on the metadata associated with the business object;
        register a at least one service provided by at least one separate computer application;
        in the user interface, dynamically create a menu based on the generated metadata associated with the business object
        dynamically extend the menu with access to a service of the at least one service relevant to the business object, wherein the relevancy between the service and the business object is identified based on the metadata; and
        launch the service by sending a corresponding request to the at least one separate application based on the metadata.

22. The system of claim 21, wherein the memory further comprises instructions to provide the metadata associated with the business object to a user interface modeling tool.

23. The system of claim 21, wherein the memory further comprises:
    a browser framework to output information received in response to the service launch; and
    a personalization engine to personalize the service based on the personalization criteria, and to segregate information.

24. The system of claim 21, wherein the memory further comprises server contextual framework to modify the metadata associated with the business object, wherein the metadata is selected from a group consisting of business object metadata, domain model metadata, user interface metadata, a validation metadata, and a vocabulary metadata.

25. The system of claim 21, wherein the memory comprises browser framework information selected from a group consisting of parse contextual metadata, parse rule definition, action definitions, user interaction elements, User Interface manipulation rules, communication protocol definition and automatic learning features.

26. The system of claim 22, wherein the memory comprises server contextual framework information selected from a group consisting of device definition, device specific context generator, pluggable provider framework and providers.

27. The system of claim 21, wherein the menu is selected from a group consisting of context menu, pie menu, drop down menu and domain bar.

28. The system of claim 21, wherein the extension of the menu comprises one or more selectable items, each item of the one or more selectable items corresponding to the business object and representing a service of the plurality of registered services; a text entry box corresponding to the service; and an agent to receive a selection of an item of the one or more selectable items and a string from the text entry box.

29. The system of claim 22, wherein the memory comprises a query sending tool to send a query based upon one or more of a selection of an item of the extension of the menu and a string to at least one server executing the separate application, and to output results received as information in response to the query.

30. The system of claim 21, wherein the service is selected from a group consisting of an internal service provided through one or more internal databases and systems of an organization, and an external service provided through one or more third party databases and systems.

31. The method of claim 1 further comprising:
    receiving information from the service in response to the service launch; and
    dynamically updating the received information for future launches of the service.

* * * * *